United States Patent Office 3,360,979
Patented Jan. 2, 1968

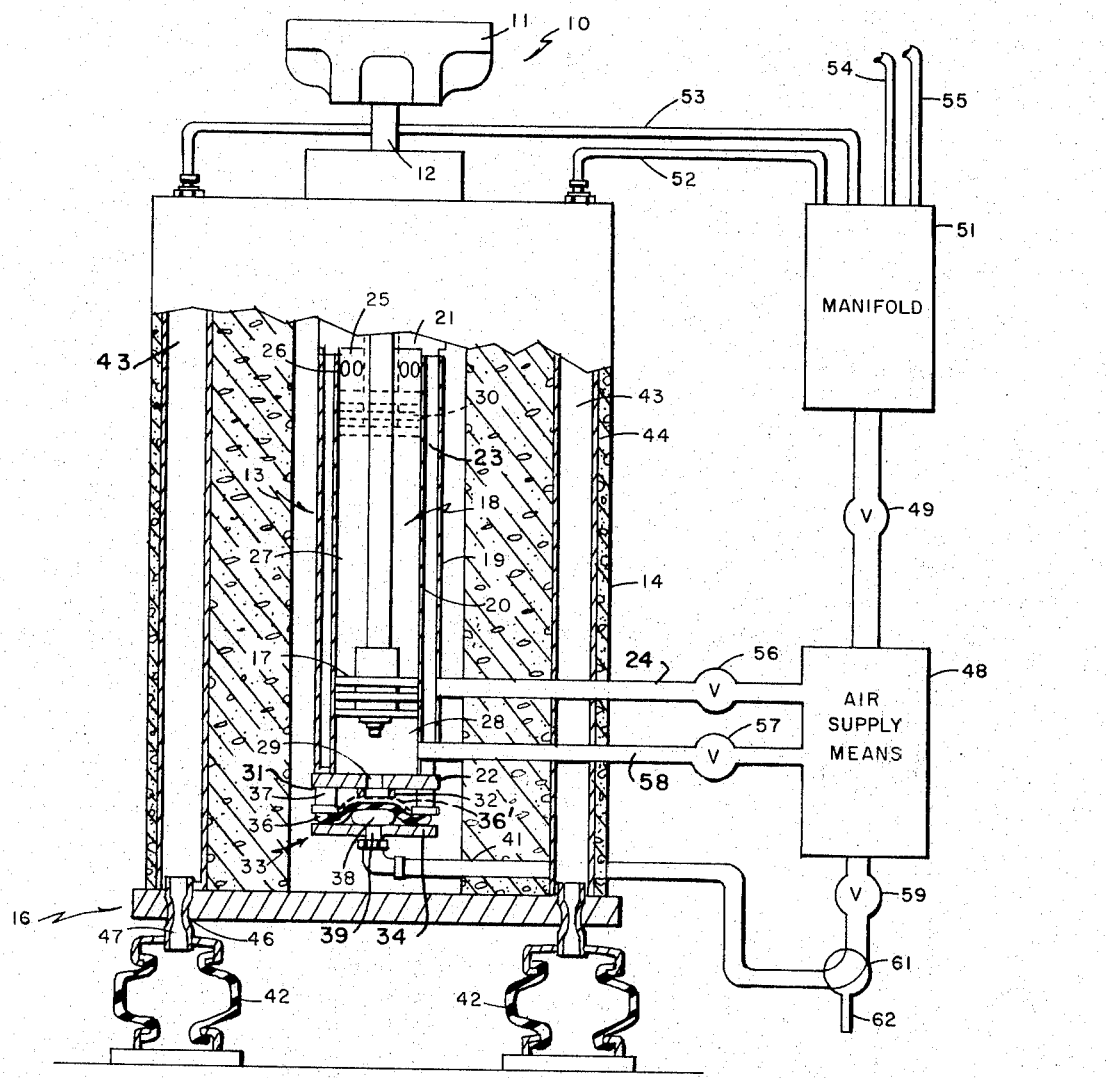
GERALD A. JENSEN
JAMES G. KAKATSAKIS
THOMAS J. LYNCH
    INVENTORS

3,360,979
SHOCK TESTING MACHINE
Gerald A. Jensen, Lowell, James G. Kakatsakis, Winchester, and Thomas J. Lynch, North Chelmsford, Mass., assignors to Arco Corporation, Cincinnati, Ohio, a corporation of Delaware
Filed Aug. 13, 1964, Ser. No. 389,354
5 Claims. (Cl. 73—12)

ABSTRACT OF THE DISCLOSURE

This invention relates to a pneumatically actuated shock testing machine embodying the combination of a fluid motor and a large capacity dump valve is exhausting fluid from the fluid motor virtually instantaneously. The machine also includes a novel pneumatic mount and damping arrangement whereby vibration is damped by absorbing energy from the passage of a fluid into and out of the mounts and a cooperating fluid accumulator.

---

This invention relates generally to impact type of shock testing machines wherein a carriage is accelerated by means of a fluid motor to obtain a desired terminal velocity for generating a specific impact, and more particularly to a semiportable, self-contained machine.

In the evolution of shock testing machines, the art has progressed from the use of gravity as an accelerating force to the use of fluid motors, generally gas motors, for supplying the accelerating force. The transition was stimulated by the need for higher performance machines calling for higher terminal velocities than could be obtained in gravity machines within a resonable physical size. Additionally, horizontal acceleration and impact as well as close control of terminal velocity is obtainable with fluid-operated machines.

Additionally, in virtually all types of shock machines a reaction mass is used to absorb the impact energy. In many cases, the reaction mass was constructed in the ground, thus making the machine immobile. The tendency at the present time is to construct fluid-activated machines having self-contained reaction masses above ground to enable a user to move the machine conveniently, to various locations. These machines require only external air and electric power to become fully operative at any location.

As the shock testing machines were required to generate higher and higher terminal velocities and accommodate large specimen masses, larger reaction masses were required to absorb the impact energy. In order not to diminish the versatility and utility of these machines, a solution was required to provide larger accelerating forces and the absorption effects of larger reaction masses within a reasonable size and configuration, a convenient height and floor space area, for example.

It is accordingly an object of the invention to provide a semiportable, self-contained shock testing machine which avoids the limitations and disadvantages of prior art machines.

It is another object of the invention to provide a high-performance easily transportable shock testing machine.

It is a further object of the invention to provide a shock testing machine which generates higher terminal velocities for a specific size and weight of the machine.

Another object of the invention is the provision of a shock testing machine which develops a higher accelerating force for a given piston stroke and piston area.

A further object of the invention is to provide a machine having a higher than normal mean effective pressure.

Still another object of the invention is to provide a highly efficient, self-contained fluid reservoir including an extremely low-loss conduit requiring no additional plumbing for connecting the reservoir to a piston cylinder.

Other objects of the invention are to provide a shock testing machine having (1) a gas motor which generates a higher than usual accelerating force; (2) a novel dump valve; (3) a suspension system which makes it possible to reduce the size of the reaction mass to at least one half of the size required in the absence of the suspension system; and (4) a combination of the foregoing three.

In accordance with one aspect of the invention, a shock testing machine having a self-contained reaction mass and a carriage accelerated to impact by a fluid motor includes a self-contained fluid reservoir for raising the mean effective fluid pressure. A dump valve is also provided on the fluid motor for rapidly exhausting fluid, which would otherwise tend to create a force opposing the accelerating force, from the fluid motor when the carriage is accelerated. The shock testing machine also includes suspension means for shock isolation and energy absorption.

Another aspect of the invention is to provide in a shock testing machine, having a carriage accelerated to impact by a fluid motor having a volumetric piston displacement of $V_1$, an internal reservoir having a volume $V_2$, whereby the ratio $V_1$ to the total volume $V_1+V_2$ is no more than 0.5. A nonrestrictive conduit means interconnecting the fluid supply means with the fluid motor is also provided.

Still another aspect of the invention is to provide in combination with a fluid motor used to accelerate a carriage in a shock testing machine a lossless dump valve for eliminating counter forces on the piston; e.g., pumping losses, and back pressure.

Still another aspect of the invention is to provide damped, low-frequency shock and vibration isolating means whereby the use of a relatively small reaction mass is possible, with the same level of shock to the surrounding equipment as with the larger mass.

The novel features that are considered characteristic of the invention are set forth in the appended claims; the invention itself, however, both as to its organization and method of operation, together with additional objects and advantages thereof, will best be understood from the following description of a specific embodiment when read in conjunction with the accompanying drawing, in which:

FIGURE 1 is a sectional representation of a shock testing machine embodying the principles of the invention in combination with a schematic representation of a fluid supply means.

Referring to FIGURE 1, there is depicted a cross-sectional representation of a shock testing machine 10 comprising a carriage 11, on which test specimens are mounted, joined by means of a rod 12 to a fluid motor, preferably a gas motor, 13. The foregoing assembly is installed within a reaction mass 14 which, in turn, is mounted on a suspension system generally designated 16.

The fluid motor 13 comprises, preferably, a pneumatically operated motor and includes a piston 17 connected to the rod 12 and positioned within a piston cylinder 18 defined by the wall 20. The term "cylinder", here, denotes function rather than geometric shape.

The fluid motor 13 also includes an outer wall 19 which is spaced from the wall 20. The outer wall 19, in combination with the end caps 21 and 22 and the wall 20, defines a compartment 23. A plurality of passages 26 are defined through the wall 20. The passages 26 place the compartment 23 in fluid communication with the upper portion 27 of the piston cylinder 18. Though the volume of the piston cylinder 18 above and below the piston 17 will vary, as the piston travels through its stroke, in size, the volume below the piston 17 is designated as the lower cylinder portion and is identified by the number 28.

The end cap 22 includes a passage, preferably by a central passage 29 for exhausting the lower cylinder portion 28 to the atmosphere. The exterior surface 31 of the end cap 22 also includes a raised circular valve seat 32, which is preferably concentric with the passage 29.

The lowermost component of the fluid motor 13 comprises a dump valve 33 which is made up of the valve seat 32, a disc 34, a rubber diaphragm 36, a plurality of spacers 37, and an actuating disc 38. The spacers 37 are spaced about the circumference of the disc 34 and are used to secure the circumference of the diaphragm 36, which is positioned between the disc 34 and a spacer 37. The disc 34 also includes a central passage 39 which is adapted to be coupled by means of a conduit 41 to an air (or other gas) supply means. The actuating disc 38 is normally situated above the passage 39 between the disc 34 and the diaphragm 36.

A suspension system 16 comprises a plurality of air mounts 42 on which are mounted the reaction mass and all of the active components of the shock testing machine 10. The suspension system 16 also includes an accumulator 43 for each mount comprising a sealed tube 44 contained in the reaction mass 14. The accumulator 43 is joined to the air mount 42 by means of a short conduit 46 containing a restriction 47. Here, too, air is the suggested fluid because of its low cost and its general availability. Other gases and, indeed, liquids could be used.

Operating fluid is supplied to the shock testing machine 10 from an air supply means 48. The air supply means 48 is coupled through a reduction valve 49 and a manifold 51 through fluid conduit means 52, 53, 54 and 55 to each accumulator 43.

Air is furnished to compartment 23 from the air supply means via reduction valve 56 and a conduit 24. Similarly, air is supplied the lower cylinder portion 28 of the piston cylinder 18 via the reduction valve 57 and conduit 58. Finally, the air supply means 48 is coupled through a reduction valve 59 and a two-way valve 61 to conduit 41, and hence to passage 39 at the bottom of the fluid motor 13.

The two-way valve 61 in the position shown separates to supply air to the conduit 41. When rotated clockwise 90 degrees in the FIGURE 1 schematic representation, the two-way valve 61 acts to exhaust air from conduit 41 into the atmosphere through conduit 62.

Before discussing the operation of the shock testing machine, several general considerations will be discussed.

It is well known that the terminal velocity of a carriage propelled by a fluid motor is a function of the mean effective pressure $P_e$ applied to the piston throughout the piston's stroke. Taking into consideration the effect of gravity, assuming a vertical direction of travel, the following relationship governs:

$$V_t = \sqrt{2gh\left(1 + \frac{P_e A}{W}\right)}$$

Where:

$V_t$=terminal velocity
$g$=the gravitational acceleration constant
$h$=initial height of the carriage above the impact plane
$P_e$=the mean effective pressure acting throughout the stroke
$A$=the effective area of the piston
$W$=the weight of the mass accelerated (carriage, specimen, rod, etc.)

It is also well known that the fluid pressure acting on the piston varies as the piston travels through its stroke. In prior art machines having reducing valves and plumbing, air cannot be supplied fast enough to maintain a substantially constant accelerating pressure. The rate of delivery is limited by the conventional small flow capacity plumbing and valves.

In any fluid motor, there is a small accumulator space above the extreme end of the piston's travel in which pressure is built up to propel the piston. Such an accumulator space (in this case an air space) is shown at 25, in FIGURE 1. Typically, change of pressure within the cylinder of a conventional air motor is, therefore, a function of the volume of the air space and the maximum volume displaced by the piston neglecting any additional supply of air from external sources. In a typical standard motor used in shock testing machines, the air space volume was 1,580 cubic inches, and the piston displacement was 3,160 cubic inches. The resulting ratio of average effective pressure $P_e$ to the initial pressure $P_o$ equals 0.304.

While the solution to the problem of maintaining a higher average effective pressure is well known, the unique arrangement shown in FIGURE 1, whereby a compartment 23 is provided immediately adjacent to the cylinder wall 20, provides a highly efficient solution both in space and effectiveness.

Increasing the piston area to obtain higher mean effective forces is not feasible since impact testing machines have maximum force requirements which cannot be exceeded.

Nor is it realistic to increase the length of the piston cylinder since this increases the overall height of the machine and, more important perhaps, the length of the rod joining the piston to the carriage.

In the same application discussed above, the volume of the compartment constructed was 7,080 cubic inches. The ratio $P_e/P_o$ with the compartment was 0.815.

For purposes of this discussion, the compartment 23 and accumulator space 25 shall comprise a reservoir.

Another important consideration was transmitting the air from the compartment to the fluid motor in such a way that the air from the compartment could be made available to the motor substantially instantaneously without a loss in pressure. The unique construction of the compartment made it possible to couple the compartment to the fluid motor by a plurality of passages 26 having a total area equal to many times the area of hoses normally used in applications of this type and also very much shorter in length. Referring to FIGURE 1 briefly, it is quite obvious that it is a relatively simple matter to construct passages 26 such that their total area exceeds the piston area. As a practical matter, however, this need not be done. The total area of the passages 26 will vary with the size of the fluid motor and the compartment. The only requirement is that their total area be large enough so that there is no significant resistance to the passage of air from the compartment to the air motor. The combined beneficial effects of a large cross-sectional area and minimum length serve to avoid one of the most serious disadvantages of prior art machines, the utilization of plumbing.

In high-performance machines, that is machines which produce maximum terminal velocities possible, the piston is dead-ended against the cylinder end cap—the air space 25 has its minimum volume—and the terminal velocity is adjusted by adjusting the pressure in the air space.

Initially, the piston is raised into contact with end cap 21 as shown by the dotted outline 30 by applying pressure to the bottom of the piston. A terminal velocity is selected by applying air to the compartment 23 and the air space 25 via the conduit 24 and the reduction valve 56. It is obvious that the pressure above the piston cannot exceed the pressure below the piston less the weight of the carriage 11 and a specimen unless a brake of the type described in Patent No. 3,103,116 is provided where higher accelerating forces are desired.

Typically, in prior art machines air below the piston is compressed and exhausted through relatively small conduits as the piston is accelerated downward. There is, obviously, resistance to the piston travel because of the inability to purge the air from the lower cylinder. This problem becomes more acute as the terminal velocities become higher; there is less time to purge the lower cylinder portion 28.

Referring to FIGURE 1, there is provided a dump valve 33 through which large quantities of air can be exhausted in a relatively short time to minimize the aforementioned resistance to the piston travel. The valve 33 is operated to close the lower cylinder portion 28 by supplying air through valves 59, 61, conduit 41 to passage 39. The pressure of the air against the disc 38 causes the disc 38 to expand the rubber diaphragm into contact with the ring 32 as shown in the dotted outline 36'. The gas pressure against disc 38 may be less than the gas pressure in the cylinder if the area of disc 38 is larger than the area of valve seat 32. As long as the air pressure is applied to disc 38, the passage 29 is closed, and the piston may be raised by supplying air through valve 57 and conduit 58 to the lower cylinder portion 28.

As pointed out above, in a high-performance motor, the piston is primarily maintained in an elevated position by the air pressure below it in the cylinder. To accelerate the carriage 11 rapidly as required for proper function of a shock testing machine, it is necessary to exhaust the air from the lower cylinder portion 28 very rapidly. This is done by rotating the valve 61 90 degrees counterclockwise, thus exhausting the relatively small amount of air in conduit 41 to the atmosphere through conduit 62. The force maintaining the diaphragm 36 in the dotted position 36' is removed, and the lower cylinder portion 28 is immediately vented to the atmosphere through passage 29. Passage 29 is obviously designed not to constrict the flow of air from the lower cylinder portion 28. Its cross-sectional area is, therefore, large and its length extremely small. In practice, the cross-sectional area of the passage 29 need not be any larger than 25 percent of the piston area, although quite obviously the larger the area the better. The reason for the foregoing criteria is the extremely short length of passage 29 in contrast to the traditional means of venting lower cylinders through small conduits and constrictive valves. The entire dump valve 33 comprises, in other words, an extremely simple and efficient pneumatic amplifier whereby the flow of a large volume of air is controlled by an extremely small amount of air under conditions where both operate efficiently and quickly.

In the suspension system, however, a constriction is intentionally built into the pneumatic system to highly damp the suspension system. The constriction is constructed in conduit 46 joining the air springs 42 to the accumulators 43 at 47. The effect of the constriction is to compress the air passing through it, thus creating a flow loss of energy derived from the impact. While the diameter of the constriction will vary with the size of the accumulator and air spring, in one application where the accumulator was 3 inches in diameter and 30 inches long a constriction of 0.040 inch to 0.060 inch was used to damp the motion of the suspended machine. Liquid mounts also function well in this application.

Though useful in providing an efficient low-frequency damped suspension system, an additional and rather unusual benefit resulting from the construction described was the achievement of vibration isolation to surrounding equipment which normally would have been obtained only by the use of a seismic block having a mass two times that which is used with the suspension system.

Because of the low-frequency response of the machine, the impact transferred to the floor builds up gradually over a longer length of time than the impact and at a lower than normal maximum amplitude. The tendency for machines without fluid suspension systems to "walk" over the floor does not happen.

It can be readily seen that this advantage results in a much smaller machine, a more easily transportable machine, a machine which requires no particular foundation requirements and may, in fact, be used without being bolted to the floor.

The various features and advantages of the invention are thought to be clear from the foregoing description. Various other features and advantages not specifically enumerated will undoubtedly occur to those versed in the art, as likewise will many variations and modifications of the preferred embodiment illustrated, all of which may be achieved without departing from the spirit and scope of the invention as defined by the following claims.

We claim:
1. In a shock testing machine having a carriage accelerated to impact by a fluid motor, said fluid motor comprising:
   (a) a first wall defining a piston cylinder;
   (b) a second wall spaced from said first wall including end caps for defining in combination with said first wall a closed compartment;
   (c) piston means disposed within said first wall defining upper and lower piston cylinder portions;
   (d) a passage defined through said first wall coupling said compartment to said upper piston cylinder portion;
   (e) and end cap for said lower piston cylinder portion having an exhaust passage defined through it and a valve seat on its exterior surface surrounding said exhaust passage;
   (f) an elastic member disposed opposite said valve seat and normally spaced from said valve seat; and
   (g) means for moving said elastic member into contact with said valve seat to seal said exhaust passage.

2. A fluid motor as described in claim 1 in which said elastic member is contacted and moved by a fluid-operated disc having an area larger than the cross-sectional area of the valve seat.

3. A fluid motor as described in claim 2 in which said fluid-operated disc is disposed between said elastic member and a fluid supply means.

4. In a shock testing machine having a self-contained reaction mass, a suspension means comprising:
   (a) a fluid mount connected to the reaction mass for supporting the entire machine in the direction of impact;
   (b) an accumulator contained in the reaction mass for said fluid mount; and
   (c) fluid conduit means joining said air mount to said accumulator, said fluid conduit for using and absorbing energy from the passage of said fluid between said mount and accumulator.

5. In a shock machine as described in claim 4, said fluid conduit comprising a sleeve having a constricted area defined thereon.

References Cited

UNITED STATES PATENTS

| 2,979,938 | 4/1961 | Ottestad | 73—12 |
| 3,093,117 | 6/1963 | Brown | 73—12 |
| 3,103,136 | 9/1963 | Bollar | 73—12 |
| 3,194,052 | 7/1965 | Melzer | 73—12 |
| 3,205,790 | 9/1965 | Bollar | 73—12 |
| 3,226,974 | 1/1966 | Bresk et al. | 73—12 |
| 3,234,960 | 2/1966 | Brumm et al. | 137—510 |

RICHARD C. QUEISSER, Primary Examiner.
JAMES J. GILL, Examiner.
J. WILLIAMSON, Assistant Examiner.

PO-1050
(5/69)

UNITED STATES PATENT OFFICE
CERTIFICATE OF CORRECTION

Patent No. 3,360,979            Dated January 2, 1968

Inventor(s) Gerald A. Jensen, Lowell, James G. Kakatsakis, Winchester, and Thomas J. Lynch, North Chelmsford, Mass.

It is certified that error appears in the above-identified patent and that said Letters Patent are hereby corrected as shown below:

Column 1, line 5, change "Arco" to -- Avco --

SIGNED AND
SEALED
MAR 3 - 1970

(SEAL)
Attest:

Edward M. Fletcher, Jr.
Attesting Officer

WILLIAM E. SCHUYLER, JR.
Commissioner of Patents